Patented June 12, 1951

2,556,896

UNITED STATES PATENT OFFICE 2,556,896

VITREOUS ENAMEL SLIP COMPOSITIONS AND METHOD OF PREPARING

William R. Beatty, Highlands, N. J., and Oliver A. Short, Staten Island, N. Y., assignors to E. I. du Pont de Nemours & Company, Wilmington, Del., a corporation of Delaware No Drawing. Application July 28, 1950,
Serial No. 176,516

10 Claims. (Cl. 106—49)

This invention relates to enamel slip compositions and particularly to water slip compositions containing vitreous enamel frits of the lead silicate, lead borosilicate and lead alkali metal silicate and borosilicate types and their application to objects, especially light metals such as aluminum and its alloys.

Vitreous enamels of the above types are well known and have been widely used, particularly when modified by the inclusion of various oxides, such as zirconium oxide, titanium oxide, antimony oxide, alkaline earth metal oxides, zinc oxide and the like, as melted-in ingredients of the enamel frit. The purpose of such modifying oxides is to improve various properties of the enamels. Various modified lead silicate and lead borosilicate enamels which are useful for the decoration of ceramic objects such as glassware, tableware and the like are described in Deyrup U. S. Patents 2,225,159, 2,225,161 and 2,278,868.

A type of vitreous lead alkali metal silicate enamel particularly well suited for enameling light metals such as aluminum, aluminum alloys or magnesium, is described in Deyrup U. S. Patent 2,467,114. Such enamels contain:

| | Mole percent |
|---|---|
| Lead oxide (PbO) | 10 to 18 |
| Silica ($SiO_2$) | 38 to 65 |
| Lithium oxide ($Li_2O$) | 5 to 12 |
| Sodium oxide ($Na_2O$) | 0 to 22 |
| Potassium oxide ($K_2O$) | 0 to 20 |
| Titanium oxide ($TiO_2$) | 0 to 11 | the total alkali metal oxide content $$(Li_2O + Na_2O + K_2O)$$

of the enamel composition being between 25 and 36 mole percent and the ratio of the silica content, or the silica content plus twice the titanium oxide content, of the composition to the total alkali metal oxide content being between 1.8 and 3.0, i. e.

$$\frac{SiO_2 + 2TiO_2}{Li_2O + K_2O + Na_2O} = 1.8 \text{ to } 3.0$$

All of the above oxides are melted-in constituents of the enamel composition. If desired, the enamel may contain a small amount of $B_2O_3$, e. g., up to about 6 mole percent. It may also contain other ingredients, e. g., pigments in amounts up to about 10% by weight.

For purposes of the present invention, the composition ranges of light metal enamels can be varied somewhat from those set forth in Patent 2,467,114. Thus, the content of melted-in $TiO_2$ can be considerably higher, e. g., up to about 20 mole percent; the PbO content can be considerably higher, e. g., up to about 30 mole percent; and the $SiO_2$ content can be somewhat lower, e. g., as low as about 30 mole percent. Also, the sum of the total alkali metal oxide content ($Li_2O + Na_2O + K_2O$) may be as low as about 23.5 mole percent, but the ratio of the sum of the $SiO_2$ content and twice the $TiO_2$ content to the total alkali metal oxide content should be between 1.8 and 3.0 as stated above.

Vitreous lead silicate, lead borosilicate, and lead alkali metal silicate and borosilicate enamels are frequently applied to objects such as ceramic ware and light metal objects by the well known spraying method using water slip compositions containing the milled enamel frit. Applications to vertical surfaces by such method often result in uneven distribution of the slip over the surface and the formation of a heavy bead of enamel at the bottom edge of the surface. Also, when spray coating small aluminum objects, such as advertising sign letters, rods, tubes, small castings and the like, the portion of the enamel slip which is lost beyond the edges of the object may range from about 1 to as high as about 10 times the amount of enamel retained on the ware. With these relatively costly enamels, such losses cannot often be tolerated economically and application by a dip method becomes necessary. Furthermore, complex aluminum articles such as air conditioner condenser fins are difficult if not impossible to coat successfully by spraying because of the close spacings involved and dipping (or slushing) is the only practical enameling method. Accordingly, there is a need for improved enamel slip compositions containing frits of the above type, which compositions can be more satisfactorily applied by the dip and spray methods.

It is an object of the invention to provide improved vitreous enamel slip compositions which are especially well suited for spray and dip applications. A particular object is to provide improved water slip compositions containing a vitreous lead silicate, lead borosilicate, or lead alkali metal silicate or borosilicate enamel frit, and especially slip compositions of this type for spray and dip applications to light metals. A further object is to provide a method of producing such slip compositions and a method of enameling involving their use. Other objects will be apparent from the following description.

Materials which exert a thixotropic effect on water slips of vitreous enamels, yield, when present in such slips, the desired result of producing a uniform wet film of the slip on a dipped or sprayed object. Examples of this type of addition agent are bentonite clay and magnesium carbonate which are used in the sheet steel enameling industry for that purpose. Neither of these materials nor additives of a similar character are adaptable for use with, for example, the above type of aluminum enamels, because of the hardening or increase in maturing temperature they produce, even when added in small amounts.

It has been discovered that water slips containing vitreous lead silicate, lead borosilicate, or lead alkali metal silicate or borosilicate enamel frits, and particularly those containing frits of these types modified by various oxide ingredients as indicated above, are rendered thixotropic by the addition thereto of relatively small amounts of a phosphoric acid, and that the resulting slip compositions have markedly improved spraying and dipping characteristics. Accordingly, the objects of the invention are accomplished by adding phosphoric acid in suitable amounts to water slips of such enamel frits and by employing the resulting slip compositions in enameling operations, particularly by the spray or dip method. The present use of phosphoric acid is especially valuable in the preparations and use of water slip compositions of enamels of the types indicated above for use in the enameling of light metals, particularly aluminum and aluminum-rich alloys containing at least 80% aluminum.

The phosphoric acid slip addition agent may be orthophosphoric acid, metaphosphoric acid, pyrophosphoric acid or mixture thereof. The presence of phosphoric acid imparts a definite and desirable "set" to the slip which facilitates the attainment of uniform coatings of the slip upon the article when applied thereto either by the dip or spray method and functions to prevent or substantially retard running when the slip is applied to vertical surfaces. Following application of the slip to the article, the coating is dried and the coated article is then fired in the usual way.

The optimum amount of phosphoric acid to be used will vary somewhat depending on the particular acid employed and the composition of the slip to which it is added. In general smaller amounts yield decreasing degrees of "set." For many uses, such as spray applications on vertical surfaces, a relatively small degree of set may be adequate. For any particular slip there will be a maximum permissible amount of acid which can be added. Addition of more than this maximum amount causes the slip rapidly to assume a thin watery consistency and also results in particle aggregation, rendering the slip useless for either dip or spray applications. Accordingly, the amount of acid should be sufficient to impart a substantial degree of set, but insufficient to cause the slip to assume a thin watery consistency.

The minimum effective amount and the maximum permissible amount of acid will vary considerably with the acid and the composition of the slip used so that no operable and preferred ranges can be given which hold true for all cases. However, such ranges for any given acid can be readily determined for any particular slip by a simple test method. The method involves adding the chosen acid in measured small increments to an agitated sample of the slip and noting the minimum amount required to produce a noticeable degree of set and the maximum amount that can be tolerated without objectionable thinning. Generally, it is merely necessary to determine by the above method the amount required to give the sample the desired set, from which amount the amount which should be added to the remainder of the batch of slip can be readily calculated.

The water content of the slip is not critical and can be varied considerably. Contents corresponding to present commercial practices are suitable and usually result in slips having densities in the ranges 1.7 to 2.4. With slips of such densities, amounts of orthophosphoric acid of about 0.00003 to 0.003 lb. (calculated as $H_3PO_4$) per pound of slip are generally effective. Smaller amounts usually are insufficient to produce a worth-while improvement in the properties of the slip whereas larger amounts generally cause objectionable thinning. The most generally preferred range is 0.0007 to 0.002 lb. per pound of slip. With metaphosphoric acid, somewhat larger amounts are usually required, the generally effective range being 0.001 to 0.015 lb. (calculated as $HPO_3$) and the preferred range being 0.002 to 0.01 lb. per pound of slip. However, it should be understood that the above ranges are merely illustrative and may not hold for slips made from some frits. Accordingly, best results are obtained in practice by determining the optimum amount of the chosen acid for each frit by the simple test method described above.

Phosphoric acid increases somewhat the instability of the water slip towards aging, i. e., towards the formation of gritty aggregates. Accordingly, the acid should be added shortly before use, usually after milling is complete. It may also be added to the mill toward the end of the milling time but it is usually preferable to avoid the presence of the acid during milling.

The invention is further illustrated by the following examples.

*Example 1*

A 1 in. diameter tube 1 ft. long constructed from 61S alloy (0.25% copper, 0.6% silicon, 1.0% magnesium, 0.25% chromium and the balance aluminum) was cleaned by treatment in a water bath containing 6% sulfuric acid and 0.25% sodium laurol sulfate for 15 min. at room temperature. The cleaned tube was treated for 4 min. at 50° C. in a water solution containing 0.2% chromic sulfate, 19.0% potassium dichromate and 3.8% sodium hydroxide, then washed, dried and fired at 540° C. for 7 min. After pre-treating in this manner, the tube was closed at one end and filled with an enamel slip. The slip used was prepared by milling together in a ball mill jar 1500 parts of an enamel frit, 90 parts of $TiO_2$, 150 parts of a mill addition agent (24% KOH, 39% $H_3BO_3$ and 26% of a water glass containing 63% water and 37% $Na_2O \cdot 3.4SiO_2$) and 650 parts of water, all parts being by weight. The composition in weight percentages of the frit used was: 33.8% PbO, 27.6% $SiO_2$, 13.5% $TiO_2$, 13.7% $Na_2O$, 2.2% $Li_2O$, 2.2% $K_2O$, 2.7% $Sb_2O_3$ and 4.3% BaO (corresponding mole percentages are: 13.6% PbO, 41.3% $SiO_2$, 15.2% $TiO_2$, 17.9% $Na_2O$, 6.6% $Li_2O$, 2.1% $K_2O$, 0.8% $Sb_2O_3$ and 2.5% BaO). Milling was continued until a 325 mesh screen retained less than 0.2% of the above materials, at which point 0.3 cc. of 85% orthophosphoric acid was added with stirring for each pound of slip. After pouring the slip into the tube it was immediately poured out again. The coating of slip adhering to the inner surface of the tube was dried to remove surface moisture, then the piece was fired at 540° C. for 7 min.

After cooling, the coating operation described above was repeated using an enamel cover slip prepared by milling together 1500 parts of a frit of the same composition as that used in the ground coat, 135 parts TiO$_2$, 112.5 parts of the mill addition agent described above and 650 parts of water. 0.3 cc. of 85% orthophosphoric acid was then added with stirring for each pound of slip. The inside of the tube was coated with this cover slip and the coating dried and fired, all operations being as described for the ground coat.

The additions of phosphoric acid made the ground and cover slips thixotropic and resulted in smooth and uniform ground and cover enamel coatings on the inside of the tube. Omission of the acid in otherwise similar operations resulted in ground and cover coatings streaked with thick and thin areas, and the formation of a heavy bead of enamel around the end of the tube from which the slip was drained.

Example 2

A vertical surface of a piece of 61S alloy was enameled using the spray method for applying the enamel slip. Prior to application of the slip, the piece was cleaned, pretreated and prefired as described in Example 1. The ground coat slip containing phosphoric acid described in Example 1 was sprayed on a vertical surface of the piece of alloy, and the piece was dried and fired at 540° C. for 7 min. After cooling, the piece was returned to its original position and a cover coat slip was sprayed on over the ground coat. This slip was prepared by milling together 1500 parts of an enamel frit, 15.75 parts of a chrome cobalt silicate blue pigment, 31.25 parts of a lead antimonate yellow pigment, 11.25 parts TiO$_2$, 112.5 parts of the mill addition agent described in Example 1 and 650 parts of water (all parts are by weight). The weight percentage composition of the frit used was: 37.3% PbO, 30.0% SiO$_2$, 12.7% TiO$_2$, 13.8% Na$_2$O, 2.3% Li$_2$O, 2.3% K$_2$O and 1.6% Sb$_2$O$_3$ (corresponding mole percentages are: 14.8% PbO, 44.0% SiO$_2$, 14.1% TiO$_2$, 17.7% Na$_2$O, 6.8% LiO$_2$, 2.1% K$_2$O and 0.5% Sb$_2$O$_3$). After milling, 0.5 cc. of orthophosphoric acid (85%) was added with stirring for each pound of slip. The resulting slip was thixotropic. After spraying on and drying the cover coat, the piece was fired at 540° C. for 7 min. The resulting green enamel coating was smooth and uniform. A non-uniform coating with ridges due to "curtaining" of the wet slip and a heavy enamel bead at the bottom edge resulted when the operations were repeated using ground and cover coat slips containing no phosphoric acid.

Example 3

The aluminum (2S) fins of an air conditioner condenser were coated with a ground coat enamel only. Coating was accomplished by the dip method because the close spacing of the fins made spray coating impossible. In this case the unit was cleaned as in Example 1, but the pretreatment with alkaline chromate solution and prefiring operations were omitted. The cleaned dry unit was dipped into the ground coat slip containing phosphoric acid, described in Example 1. After drying and firing the dipped unit at 540° C. for 30 min. the fins were found to be coated with a thin uniform layer of vitreous enamel. When no phosphoric acid was used, heavy beads of enamel appeared at the edges of the fins and the remainder of the coating was irregular and nearly bare in places.

Example 4

Small sheets of 61S aluminum alloy were cleaned, pretreated and prefired as in Example 1. They were then dipped in a ground coat slip prepared as in Example 1 except that the orthophosphoric acid was replaced by metaphosphoric acid. Two grams of a 40% metaphosphoric acid solution in water were added per 100 grams of slip. After drying, the coated sheets were fired at 540° C. for 7 min. A uniform ground coat application was obtained. Without the phosphoric acid, the coating was non-uniform and nearly bare in places.

Example 5

A water slip of a commercial glass enamel was prepared by milling a mixture of the enamel frit, TiO$_2$ pigment (about 10% based on the weight of the frit) and water. The frit used contained the following melted-in constituents: 52.0% PbO, 6.2% B$_2$O$_3$, 31.0% SiO$_2$, 1.9% ZnO, 1.0% TiO$_2$, 4.3% Na$_2$O and 3.6% ZrO$_2$. The addition to the slip of phosphoric acid in the proportion of 1 lb. of 85% orthophosphoric acid per 100 lbs. of slip imparted a substantial and desirable degree of set to the slip. (All percentages are by weight.)

Example 6

The addition of 1 lb. of 85% orthophosphoric acid to a water slip of a commercial acid resistant enamel for use in enameling tumblers, cups and saucers, bottles and the like, substantially improved the set of the slip. The water slip to which the acid was added was prepared by milling together a mixture of the enamel frit, a cadmium sulfoselenide pigment (10% based on the weight of the frit) and water. The frit used contained the following melted-in constituents: 56.9% PbO, 2.1% B$_2$O$_3$, 31.7% SiO$_2$, 4.5% TiO$_2$, 1.7% NaO, 2.1% CdO and 1.0% Li$_2$O. (All percentages are by weight).

In enameling light metals such as aluminum, the surface to be enameled should be free of dirt, grease and corrosion products. Any method of cleaning may be used and that shown in the Examples 1 to 4 is generally effective. Except in the case of commercially pure aluminum (2S), the cleaned surface is preferably pretreated with an aqueous alkaline solution of a chromate and then heat-treated a short time at a temperature between about 350° C. and the temperature at which the aluminum alloy is deleteriously affected by heat, usually about 600° C., as described in the pending application of Deyrup and Peterson, Ser. No. 758,470, filed July 1, 1947, and now Patent No. 2,544,139. The treating solution should have a chromate content of about 0.25 to 25% by weight, expressed as potassium chromate, and its pH should be within the range 8 to 14. Usually the time of contact with the solution will be about 1 to 30 minutes and the time of the subsequent heat treatment about 2 to 10 min. Such a pretreatment is effective in producing enamel coated aluminum alloy articles which are free from water-spalling.

As indicated previously, the present enamel slip compositions are prepared by adding the phosphoric acid to the preformed slip or to the slip near the end of the milling operation. In the case of aluminum enamels, the slip to which the acid is added preferably will contain an alkali metal silicate and an alkali metal metaborate in combined amounts equalling 1 to 10% of the weight of the enamel and in proportions corresponding to an alkali metal silicate-alkali metal metaborate mixture consisting of 10–30% SiO₂, 20 to 40% B₂O₃ and 30 to 60% Na₂O (or K₂O) by weight. The use of such a combination of an alkali metal silicate and an alkali metal metaborate as a mill addition agent in the preparation of water slips of light metal enamels is described and claimed in pending Deyrup application Ser. No. 167,929, filed June 13, 1950, as a continuation-in-part of application Ser. No. 87,343, filed April 13, 1949, and abandoned June 16, 1950. Slip compositions of aluminum enamels containing such an agent are highly resistant to "tearing" and "crawling" during firing.

Other mill addition agents, for example, ceramic pigments, bonding agents and the like can generally be added as desired or required in the preparation of the slip compositions to which the phosphoric acid is added in accordance with the present invention. However, addition agents, such as carbonates, which react readily with phosphoric acid should be avoided.

We claim:

1. A vitreous enamel composition comprising a water slip of an enamel frit from the group consisting of lead silicate, lead borosilicate, lead alkali metal silicate and lead alkali metal borosilicate enamel frits, said slip containing an acid from the group consisting of orthophosphoric acid, metaphosphoric acid and pyrophosphoric acid, in an amount sufficient to impart a substantial degree of set to said slip but insufficient to cause objectionable thinning thereof.

2. A vitreous enamel composition suitable for the enameling of light metals comprising a water slip of an enamel frit, said slip containing an acid from the group consisting of orthophosphoric acid, metaphosphoric acid and pyrophosphoric acid, in an amount sufficient to impart a substantial degree of set to said slip but insufficient to cause objectionable thinning thereof, said enamel frit comprising:

10 to 30 mole percent PbO
    30 to 65 mole percent SiO₂
    5 to 12 mole percent Li₂O
    0 to 22 mole percent Na₂O
    0 to 20 mole percent K₂O, and
    0 to 20 mole percent TiO₂ the total alkali metal oxide content $$(Li_2O + Na_2O + K_2O)$$

of said frit being between 23.5 and 36 mole percent, and the ratio of the sum of said SiO₂ content and twice said TiO₂ content of said frit to said total alkali metal oxide content being between 1.8 and 3.0, all of said oxide constituents of said frit being melted-in constituents.

3. A composition according to claim 2 wherein the acid is orthophosphoric acid.

4. A composition according to claim 2 wherein the acid is metaphosphoric acid.

5. A composition according to claim 2 wherein the acid is pyrophosphoric acid.

6. A method of preparing a water slip of a vitreous enamel suitable for the application of uniform coatings to objects, which slip contains an enamel frit from the group consisting of lead silicate, lead borosilicate, lead alkali metal silicate and lead alkali metal borosilicate enamel frits, comprising adding to a mixture of water and said enamel frit an acid from the group consisting of orthophosphoric acid, metaphosphoric acid and pyrophosphoric acid, in an amount sufficient to impart a substantial degree of set to said slip but insufficient to cause objectionable thinning thereof.

7. A method of preparing a water slip of a vitreous enamel suitable for the application of uniform coatings to light metals, comprising adding to a mixture of water and an enamel frit an acid from the group consisting of orthophosphoric acid, metaphosphoric acid and pyrophosphoric acid, in an amount sufficient to impart a substantial degree of set to said slip but insufficient to cause objectionable thinning thereof, said enamel frit comprising:

10 to 30 mole percent PbO
    30 to 65 mole percent SiO₂
    5 to 12 mole percent Li₂O
    0 to 22 mole percent Na₂O
    0 to 20 mole percent K₂O, and
    0 to 20 mole percent TiO₂ the total alkali metal oxide content $$(Li_2O + Na_2O + K_2O)$$

of said frit being between 23.5 and 36 mole percent, and the ratio of the sum of said SiO₂ content and twice said TiO₂ content of said frit to said total alkali metal oxide content being between 1.8 and 3.0, all of said oxide constituents of said frit being melted-in constituents.

8. A method of enameling aluminum and aluminum-rich alloy articles comprising applying thereto a vitreous enamel slip composition as defined in claim 2 and firing the resulting coated article.

9. A method according to claim 8 wherein the slip composition is applied to the article by a dipping method.

10. A method according to claim 8 wherein the slip composition is sprayed onto the article.

WILLIAM R. BEATTY.
OLIVER A. SHORT.

No references cited.